Patented Oct. 5, 1954

2,690,965

UNITED STATES PATENT OFFICE 2,690,965

HERBICIDAL COMPOSITION

Robert Earl Emond, Mooretown, Ontario, and Francis Grant Moffat, Toronto, Ontario, Canada, assignors to Standard Oil Development Company, a corporation of Delaware No Drawing. Application April 29, 1953,
Serial No. 352,042

3 Claims. (Cl. 71—2.3)

This invention relates to improvements in deweeding transplanted celery crops.

It is known that weeds in celery seedbeds may be killed without injuring the crop plants if about forty gallons of Stoddard Solvent are used as the herbicidal spray. In commercial celery growing, the plants are about six inches high when they are transplanted to the celery garden (usually a muck soil) where they grow to maturity. On this organic soil many weeds such as purslane (Portulacea oleracea L.) and lambs quarters (Chenapodium album L.) grow profusely. Celery, unlike other plants in the Umbelliferae family, becomes susceptible to herbicidal applications of Stoddard Solvent if applied later than three weeks after transplanting. Hitherto, no known composition has been developed that could be used to deweed such a susceptible crop without causing crop damage such as loss in weight, deterioration of the heart (called black heart), and an abnormal amount of sucker growth. Such plants are unsuitable for market.

It has now been found that these difficulties in the use of Stoddard Solvent are completely overcome by utilizing that component in the form of an aqueous emulsion. These emulsions can be applied to transplanted celery up to 33 days after the crop has been transplanted without loss in crop weight or deterioration to the celery heart.

It is indeed surprising to learn of the superior selective effect of the aqueous emulsions of this invention, because normally selective herbicides are seldom effective in this form because of the resultant non-selective wetting of both weeds and crop obtained.

The plants of the celery family, if sprayed with Stoddard Solvent, show different physiological effects immediately after spraying, viz., the plant processes photosynthesis and transpiration will fall below normal during the first forty-eight hours after spraying, while the respiration rate will rise above normal. In other words, sprayed plants require more moisture than those not sprayed. By using an emulsion such as here described, it would appear that adequate moisture is made available for the plant to carry on its normal life processes, and, as a result, the celery crop may be sprayed later than three weeks after transplanting. At this time, the increased size of the plant makes a greater demand for moisture. It should, of course, be realized that this invention is not limited by any theory of operation.

The aqueous emulsions of this invention contain from about 60 to about 30 volume per cent Stoddard Solvent, about 1 to 5 volume per cent of an oil-soluble and preferably water-soluble emulsifying agent, and the balance water.

The compositions are preferably first made up in the form of emulsion concentrates prior to shipping to the site of use, and then subsequently diluted with water. The emulsion concentrate compositions thus comprise about 98.5 to 86 volume per cent Stoddard Solvent and 1.5 to 14 parts volume per cent oil-soluble emulsifying agent.

The use of these emulsifying agents also increases the spreading action of the spray by decreasing the surface tension of the water carrier.

The Stoddard Solvent utilized is the well-known refined petroleum product having a boiling point range of 300°–400° F., an aromatic content of from 6–24 volume per cent, and a naphthenic content of from 41–94 volume per cent. A typical inspection is as follows:

| | |
|---|---|
| Gravity, ° A. P. I. | 48.3 |
| Aniline point, ° F. | 135 |
| Distillation range, ° F. | 312 to 392 |
| Volume percent aromatics | 16.0 |
| Volume percent naphthenes | 41.0 |
| Volume percent paraffins | 43.0 |

Among the oil-soluble, and preferably water-soluble, emulsifying agents that can be used are the sulfonates of long-chain alcohols such as dodecanol up to octadecanol, sulfonated amide and ester derivatives, sulfonated aromatic and mixed alkylaryl sulfonated derivatives, esters of fatty acids such as the ricinoleic acid ester of sorbitol, and petroleum sulfonates of $C_{10}$–$C_{20}$ length. The non-ionic emulsifying agents such as the ethylene oxide condensation products of alkylated phenols may be used. Particularly effective and suitable emulsifying agents are polyoxyethylene sorbitol laurate and polyoxyethylene sorbitol oleate-laurate.

The following examples illustrate this invention and indicate test results obtained on the compositions of this invention.

EXAMPLE I

*Effect of Stoddard Solvent sprays to early-transplanted celery*

During May and June 1951, a series of sprays were applied at the rate of 60 gallons (Imperial) per acre to early-transplanted celery (variety Salt Lake). The plants were cut and trimmed as is the practice before packing for market or storage. Subsequently, the plants were weighed. Table I presents the statistical data obtained in this experiment.

TABLE I

| No. of Days Between Planting and Spraying | Mean Wt. of 60 Untrimmed Plants (gms.) [1] | Mean Wt. of 60 Marketable Trimmed Plants (gms.) [2] | Percent Loss in Weight of Crop | No. of Plants Showing Heart Deterioration (Total of 60 Plants) |
|---|---|---|---|---|
| Control | 479 | 366 | | 0 |
| 7 | 482 | 361 | 1 | 0 |
| 14 | 472 | 332 | 9 | 0 |
| 19 | 451 | 340 | 11 | 0 |
| 25 | 395 | 275 | 25 | 8 |

[1] Necessary difference between means at 5% level of significance 66.7.
[2] Necessary difference between means at 5% level of significance 46.3.

EXAMPLE II

*Effect of Stoddard Solvent sprays on late-transplanted celery*

Late celery was transplanted July 12, 1951, and was observed to have reformed a suitable root system after ten days' growing. Commencing on July 22, 1951, the first of a series of Stoddard Solvent sprays were applied at the rate of 60 gallons per acre to randomized plots replicated six times.

Weights of both trimmed and untrimmed celery were obtained at harvest October 15. The data were analyzed statistically and are presented in Table II.

TABLE II

| No. of Days Between Planting and Spraying | Mean Wt. of 60 Untrimmed Plants (gms.) [1] | Mean Wt. of 60 Marketable Trimmed Plants (gms.) [2] | Percent Loss in Weight of Crop | No. of Plants Showing Heart Deterioration (Total of 60 Plants) |
|---|---|---|---|---|
| Control [1] | 1,529 | 1,217 | | 0 |
| Control [2] | 1,482 | 1,199 | | 0 |
| 10 | 1,487 | 1,224 | | 0 |
| 16 | 1,448 | 1,200 | 1 | 0 |
| 26 | 1,251 | 713 | 41 | 14 |
| 30 | 899 | 455 | 63 | 26 |

[1] Necessary difference between means at 5% level of significance 268.
[2] Necessary difference between means at 5% level of significance 258.

EXAMPLE III

*Effect of Stoddard Solvent sprays to late-transplanted celery*

In 1952 another experiment was conducted similar to the above. Table III presents these data obtained form this study.

From the data in Table III it is apparent that transplanted celery becomes very susceptible to sprays of Stoddard Solvent as the plants mature where normal growing conditions prevail. This is made evident by a loss in weight of crop, an increase in number of plants showing heart deterioration, and finally an abnormal number of basal suckers.

TABLE III

| No. of Days Between Planting and Spraying | Mean Wt. of 60 Marketable Plants (gms.) | Percent Loss in Wt. of Crop | No. of Plants Showing Heart Deterioration (Total of 60 Plants) |
|---|---|---|---|
| Control | 797 | | 0 |
| 10 | 849 | | 0 |
| 19 | [1] 293 | [1] 63 | 28 |
| 26 | 697 | 12 | 9 |
| 33 | 625 | 22 | 13 |

[1] Low mean weight value and high percent loss in weight was attributed to drought conditions prevailing on this farm at the time plants were srayed.

These examples indicate how the percentage loss in weight of the crop and the number of plants showing heart deterioration increase sharply with the spraying with Stoddard Solvent after about three weeks following transplanting.

EXAMPLE IV

An additional experiment was carried out under the same experimental conditions as in Example III. For this work the following composition, Table IV, was applied to the celery at the time when the plants were known (from previous work) to be susceptible to the oil sprays; Table V gives the results of spraying this improved composition on transplanted celery.

TABLE IV—COMPOSITION

50% by weight Stoddard Solvent.
2–5% by weight of an emulsifier (polyoxyethylene sorbitol laurate or polyoxyethylene sorbitol oleate-laurate).
44–48% by weight water.

TABLE V

| No. of Days Between Planting and Spraying | Mean Wt. of 30 Marketable Plants (gms.) | Percent Loss in Wt. of Crop | No. of Plants Showing Heart Deterioration (Total of 30 Plants) |
|---|---|---|---|
| Control | 797 | | 0 |
| 33 | 815 | 0 | 2 |

This example shows how the utilization of the composition of this invention resulted in no reduction in crop yield, even after 33 days following transplanting of the celery.

The compositions of this invention are utilized in quantities of about 20 to 100 gallons per acre.

The advantages of this invention are apparent. There is no loss in the main crop following deweeding. Small acreages can be kept free of weeds without hired hands until the crop is well matured. The spreading habits of the more mature celery plants prevent a great many weeds from growing. The improved sprays of this invention, by keeping the transplanted celery free of weeds prior to this time, contribute to a lessening of the problem thereafter. The utilization of aqueous compositions is economical of course, and is a considerable saving, especially to growers in remote garden areas.

This invention has been described with respect to specific embodiments, but is not to be limited thereby, except as indicated in the appended claims.

What is claimed is:
1. A method of selectively eradicating weeds from transplanted celery plots which comprises distributing so as to effect contact with the weeds an aqueous emulsion of a refined petroleum oil having a boiling point range of 300°–400° F., an aromatic content of from 6 to 24 volume per cent, and a naphthenic content of from 41 to 94 volume per cent, said emulsion containing an oil-soluble emulsifying agent which lowers the surface tension of water, the petroleum oil being present in an amount of about 60 to 30 volume per cent, the oil soluble emusifying agent being present in an amount of about 1 to 5 volume per cent with the balance water and the aqueous emulsion being applied to the transplanted celery plot in an amount of about 20 to 100 gallons per acre.

2. The process of claim 1 in which the oil-soluble emulsifying agent is polyoxyethylene sorbitol laurate.

3. The process of claim 1 in which the oil-soluble emulsifying agent is polyoxyethylene sorbitol oleate-laurate.

No references cited.